United States Patent
Kim (10) Patent No.: US 10,859,005 B2
(45) Date of Patent: Dec. 8, 2020

(54) THROTTLE VALVE ASSEMBLY

(71) Applicant: HYUNDAI KEFICO CORPORATION, Gyeonggi-do (KR)

(72) Inventor: Bo Kyeong Kim, Daegu (KR)

(73) Assignee: HYUNDAI KEFICO CORPORATION, Gyeonggi-do (KR)

( * ) Notice: Subject to any disclaimer, the term of this patent is extended or adjusted under 35 U.S.C. 154(b) by 49 days.

(21) Appl. No.: 16/234,266

(22) Filed: Dec. 27, 2018

(65) Prior Publication Data
US 2019/0195145 A1    Jun. 27, 2019

(30) Foreign Application Priority Data

Dec. 27, 2017  (KR) .......................... 10-2017-0180587

(51) Int. Cl.
*F02D 9/00* (2006.01)
*F02D 9/10* (2006.01)
(Continued)

(52) U.S. Cl.
CPC ............... *F02D 9/107* (2013.01); *F02D 9/02* (2013.01); *F02D 9/108* (2013.01); *F02D 9/1035* (2013.01); *F02D 9/1065* (2013.01); *F02D 2009/0254* (2013.01); *F16K 27/0218* (2013.01); *F16K 31/535* (2013.01)

(58) Field of Classification Search
CPC .. F16K 27/0218; F16K 31/041; F16K 31/535; F02D 9/107; F02D 9/02; F02D 9/1035; F02D 9/1065; F02D 9/108; F02D 9/104; F02D 9/1045; F02D 2009/0254
See application file for complete search history.

(56) References Cited

U.S. PATENT DOCUMENTS

| 2001/0015195 A1 | 8/2001 | Torii et al. |
| 2002/0056478 A1* | 5/2002 | Scholten ............... F02D 9/1035 137/554 |

(Continued)

FOREIGN PATENT DOCUMENTS

| JP | 2001-263098 A | 9/2001 |
| JP | 2001-303983 A | 10/2001 |

(Continued)

*Primary Examiner* — Kevin F Murphy
*Assistant Examiner* — Kelsey E Cary
(74) *Attorney, Agent, or Firm* — Mintz Levin Cohn Ferris Glovsky and Popeo, P.C.; Peter F. Corless (57) ABSTRACT

Provided is a throttle valve assembly which reduces weight, number of manufacturing processes, and manufacturing cost thereof by coupling a throttle body formed of plastic to a reinforcement portion manufactured by a die casting method with an insert method. The throttle valve assembly includes a valve body having an intake passage, a mounting space that communicates with the intake passage, a motor accommodating space, and a mounting groove formed between the mounting space and the motor accommodating space. The valve body includes plastic. The throttle valve assembly further includes a valve plate coupled to a rotary shaft rotatably installed in the intake passage of the valve body to adjust an amount of air or a mixed gas ingested into an engine; and a reinforcement portion formed of a metal and coupled to an inside of the valve body by an insert injection method.

7 Claims, 7 Drawing Sheets

(51) Int. Cl.
  *F02D 9/02*   (2006.01)
  *F16K 27/02*  (2006.01)
  *F16K 31/53*  (2006.01)

(56) References Cited

U.S. PATENT DOCUMENTS

| | | | |
|---|---|---|---|
| 2002/0152988 A1* | 10/2002 | Michels | F02D 9/10 |
| | | | 123/337 |
| 2004/0149257 A1 | 8/2004 | Meiwes et al. | |
| 2005/0204558 A1 | 9/2005 | Hannewald | |
| 2006/0138697 A1 | 6/2006 | Lorenz et al. | |
| 2007/0069170 A1* | 3/2007 | Aoki | F02D 9/1035 |
| | | | 251/129.11 |
| 2010/0263618 A1* | 10/2010 | Keefover | F02D 9/1035 |
| | | | 123/190.1 |
| 2012/0097129 A1* | 4/2012 | Damasceno | B22D 19/12 |
| | | | 123/337 |

FOREIGN PATENT DOCUMENTS

| | | |
|---|---|---|
| JP | 2003-120340 A | 4/2003 |
| JP | 2006-521939 A | 9/2006 |
| KR | 10-2005-0044777 A | 5/2005 |

\* cited by examiner

THROTTLE VALVE ASSEMBLY

CROSS-REFERENCE TO RELATED APPLICATION

This application claims priority to and the benefit of Korean Patent Application No. 10-2017-0180587, filed on Dec. 27, 2017, the disclosure of which is incorporated herein by reference in its entirety.

TECHNICAL FIELD

The present disclosure relates to a throttle valve assembly, and more specifically, to a throttle valve assembly which reduces weight, number of manufacturing processes, and manufacturing cost thereof by coupling a throttle body formed of plastic to a reinforcement portion manufactured by a die casting method with an insert method.

RELATED ART

An engine of a vehicle requires a proper amount of air to be supplied along with injection of fuel to be operable. Generally, the control of air flow into the engine during operation is adjusted based on the opening/closing degree of a throttle valve that is adjusted as a driver presses an accelerator pedal.

A throttle valve is connected to an accelerator pedal using a linkage or wire and controls the amount of air or a mixed gas suctioned into the engine. The throttle valve uses a valve configured to achieve a hydraulic pressure suitable for a load of the engine depending on the degree to which a force of the accelerator pedal is applied. Among throttle valves provided in vehicles for the above-described use, a butterfly-valve-type throttle valve assembly includes a rotary shaft and a valve plate and is installed within an intake passage, through which air or fuel is introduced, with the rotary shaft installed at the center of the intake passage and the disk-shaped valve plate mounted on the rotary shaft.

In addition, the rotary shaft having the valve plate mounted thereto is connected to an accelerator pedal of a driver's seat by an accelerator cable to cause the valve plate to be rotated to adjust the amount of inflow of air or fuel introduced through the intake passage. Accordingly, when a driver presses the accelerator pedal to accelerate the vehicle, the accelerator cable is pulled to rotate the rotary shaft, causing the valve plate mounted on the rotary shaft to be rotated to allow the valve plate mounted on the rotary shaft to be rotated, thereby increasing the area of a flow path of the intake passage. As the area of the flow path is increased, the amount of air or fuel ingested through the intake passage increases. Conversely, when the driver releases the accelerator pedal, the accelerator cable is loosened, causing the valve plate to be rotated in the opposite direction to close the intake passage, thereby reducing the amount of air or fuel ingested through the intake passage.

Meanwhile, most throttle valve assemblies are manufactured using aluminum casting. The throttle valve assembly formed of aluminum is heavy and difficult to satisfy a dimensional tolerance, and thus, requires post-processing processes, which increases the manufacturing process time and the unit price.

In order to remove such constraints, recently, the throttle valve assemblies have been manufactured using plastic in attempt to alleviate the above described constraints. However, due to the characteristics of the butterfly type throttle valve assembly in which a part of a valve body repeatedly collides with an outer circumferential surface of a valve plate, the valve body is damaged by repeated opening and closing of the valve plate, or a part of the valve body that supports the valve plate is worn or stretched in supporting a rotary shaft of the valve plate. As a result, the valve plate fails to be rotated smoothly in prolonged use.

Further, in a structure in which a shaft of a gear is fixed to the valve body, a thermal deformation of the valve body causes a shaft-to-shaft distance to be changed.

SUMMARY

The present disclosure is directed to providing a throttle valve assembly capable of preventing a valve body from being worn or damaged by a component coupled to the valve body. The technical objectives of the present disclosure are not limited thereto, and other objectives may become apparent to those of ordinary skill in the art based on the following description.

According to an aspect of the present disclosure, there is provided a throttle valve assembly for supporting a motor coupled to a pinion gear to generate power, an intermediate gear meshed with the pinion gear, and a segment gear meshed with the intermediate gear to be rotated by the power generated from the motor. In particular, the throttle valve assembly may include a valve body having an intake passage, a mounting space that communicates with the intake passage, a motor accommodating space, and a mounting groove formed between the mounting space and the motor accommodating space. The valve body may include plastic. The throttle valve assembly may include a valve plate coupled to a rotary shaft rotatably installed in the intake passage of the valve body to adjust an amount of air or a mixed gas ingested into an engine; and a reinforcement portion formed of a metal and coupled to an inside of the valve body by an insert injection method.

The reinforcement portion may include a valve mounting portion formed in a shape that corresponds to an inner circumferential surface of the intake passage to be coupled to the inner circumferential surface of the intake passage, a first mounting portion formed in a shape that corresponds to an inner circumferential surface of the mounting space to be coupled to the inner circumferential surface of the mounting space and perpendicularly passing through the valve mounting portion to communicate with the valve mounting portion, a second mounting portion spaced apart from the first mounting portion and formed in a shape that corresponds to an inner circumferential surface of the mounting groove to be coupled to the inner circumferential surface of the mounting groove, and a first connecting portion disposed between the first mounting portion and the second mounting portion to connect the first mounting portion to the second mounting portion.

The segment gear may be rotatably coupled to the first mounting portion, and the intermediate gear may be rotatably coupled to the second mounting portion. The segment gear may be coupled to an end of the rotary shaft of the valve plate to rotate the valve plate.

The reinforcement portion may further include a third mounting portion disposed to be spaced apart from the second mounting portion to receive the motor therein and a second connecting portion disposed between the second mounting portion and the third mounting portion to connect the second mounting portion to the third mounting portion. The third mounting portion may have a vertical length less than or equal to a vertical length of the second mounting portion. The third mounting portion may be provided with an extending portion that extends downward therefrom. The reinforcing portion may further include an auxiliary connecting portion dispose under the second connecting portion between the third mounting portion and the valve mounting portion to connect the extending portion to the valve mounting portion.

BRIEF DESCRIPTION OF THE DRAWINGS

A brief description of each drawing is provided to more sufficiently understand drawings used in the detailed description of the present disclosure.

DETAILED DESCRIPTION

Hereinafter, advantages and features of the present disclosure and manners of achieving them will become apparent with reference to descriptions of the following exemplary embodiments when considered in conjunction with the accompanying drawings. However, the scope of the present disclosure is not limited to such exemplary embodiments, and the present disclosure may be realized in various forms. The exemplary embodiments to be described below are embodiments provided only to complete the present disclosure and assist those skilled in the art in fully understanding the scope of the present disclosure. The present disclosure is defined only by the scope of the appended claims.

Meanwhile, terms used herein are used to aid in the explanation and understanding of the present disclosure and are not intended to limit the scope and spirit of the present disclosure. It should be understood that the singular forms "a," "an," and "the" also include the plural forms unless the context clearly dictates otherwise. The terms "comprises," "comprising," "includes," and/or "including," when used herein, specify the presence of stated features, integers, steps, operations, elements, components and/or groups thereof, and do not preclude the presence or addition of one or more other features, integers, steps, operations, elements, components, and/or groups thereof.

Figure 1:
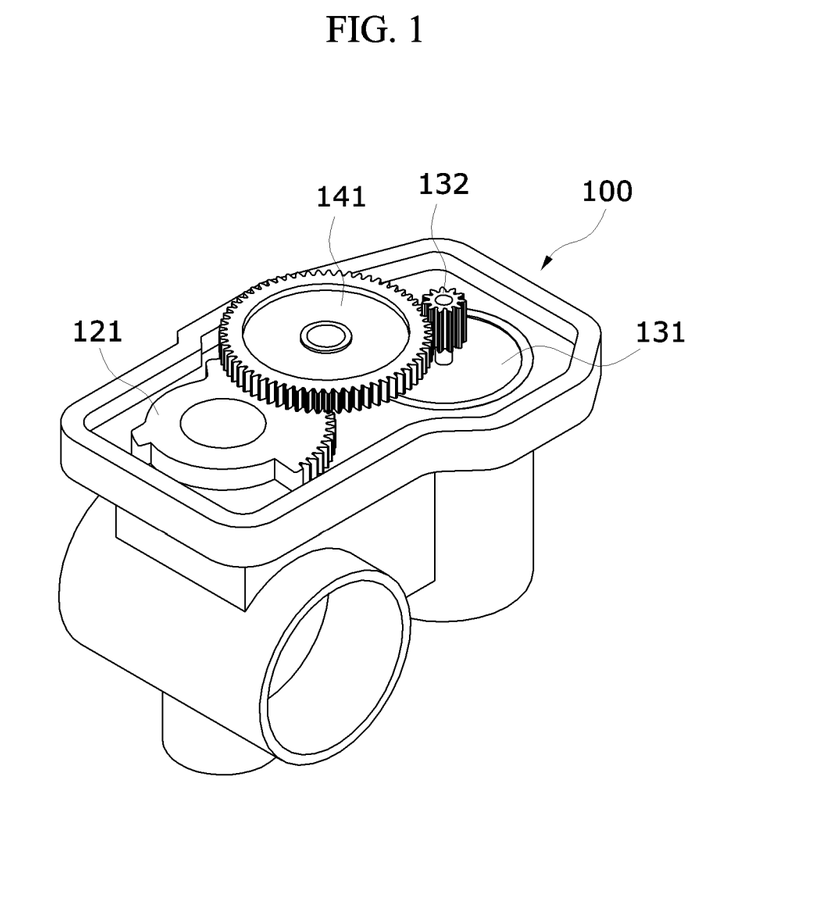
FIG. 1 is a perspective view illustrating a throttle valve assembly according to an exemplary embodiment of the present disclosure.
Figure 2:
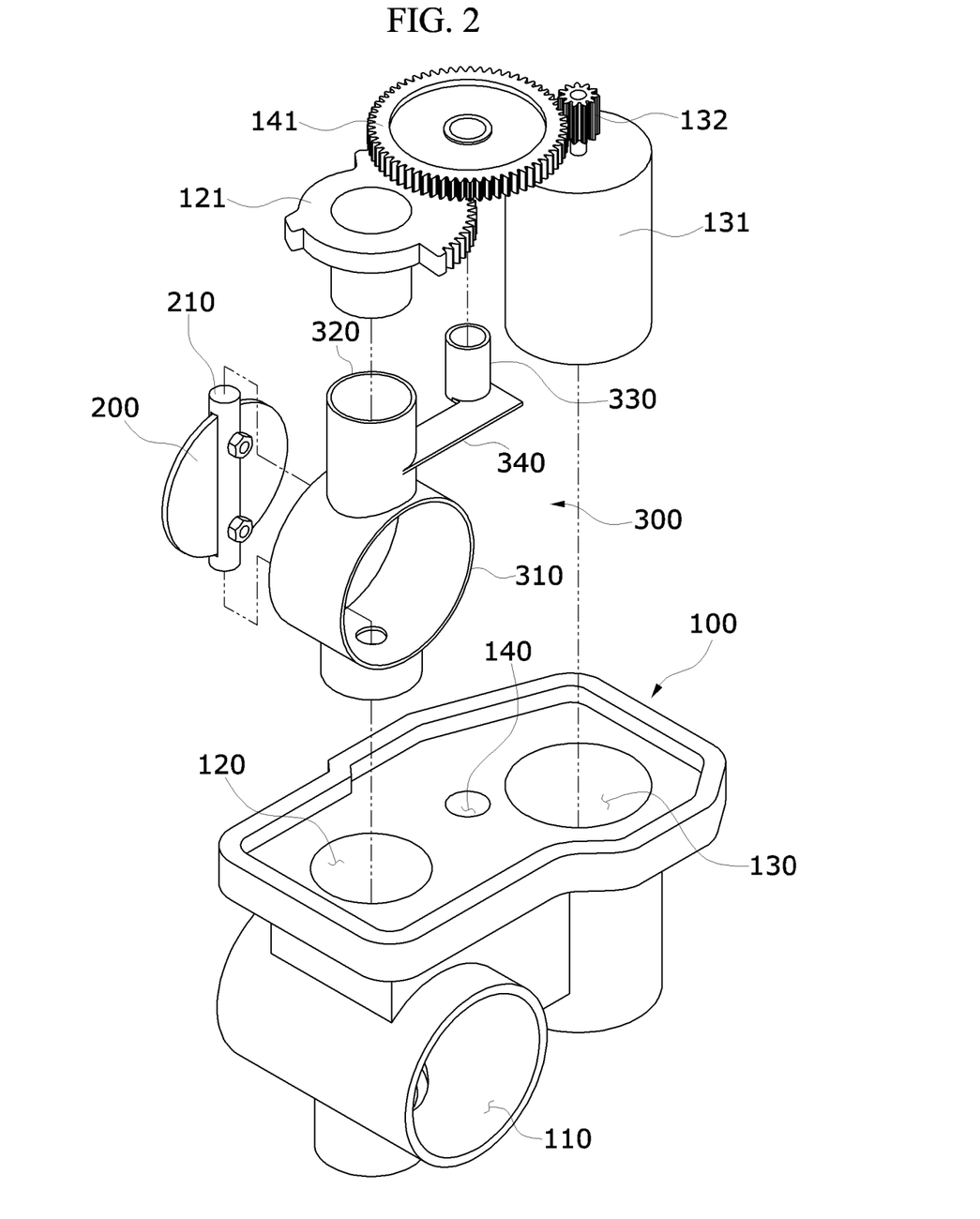
FIG. 2 is an exploded perspective view illustrating the throttle valve assembly according to the exemplary embodiment of the present disclosure.
Figure 3:
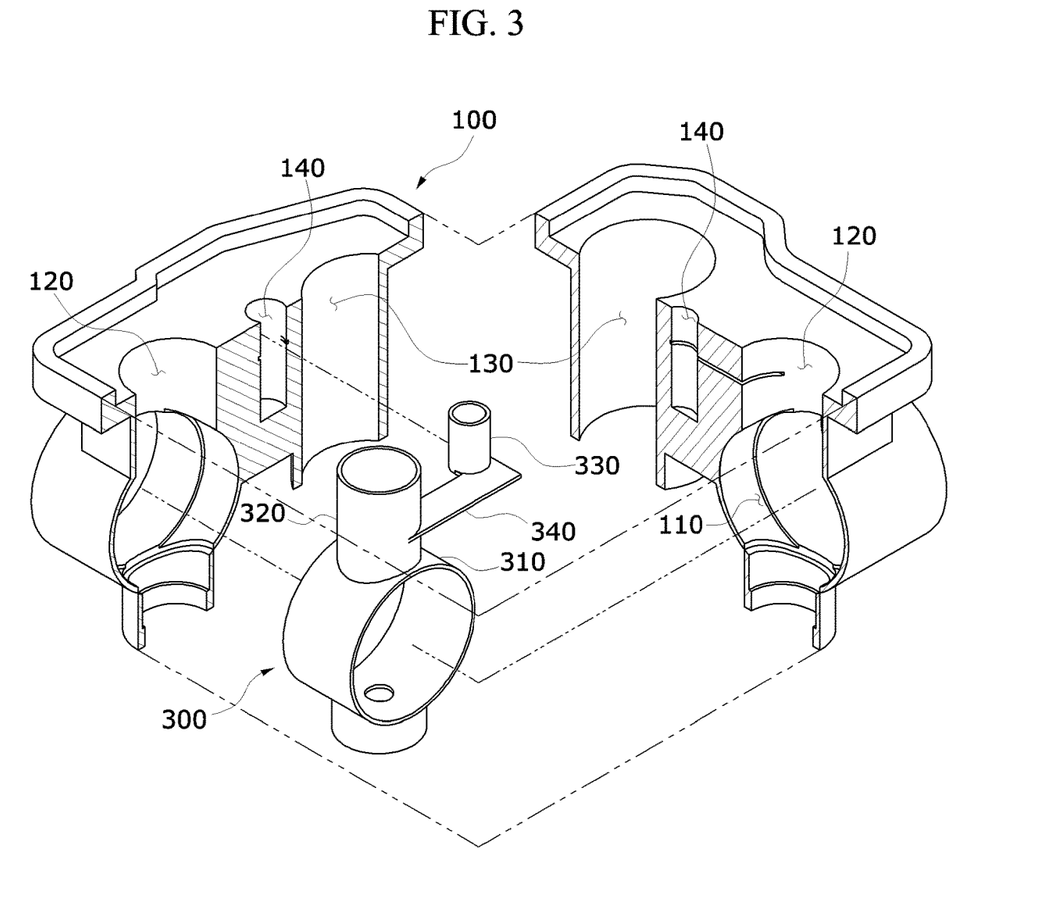
FIG. 3 is an exploded cross-sectional perspective view illustrating a valve body and a reinforcement portion according to the exemplary embodiment of the present disclosure.
Figure 4:
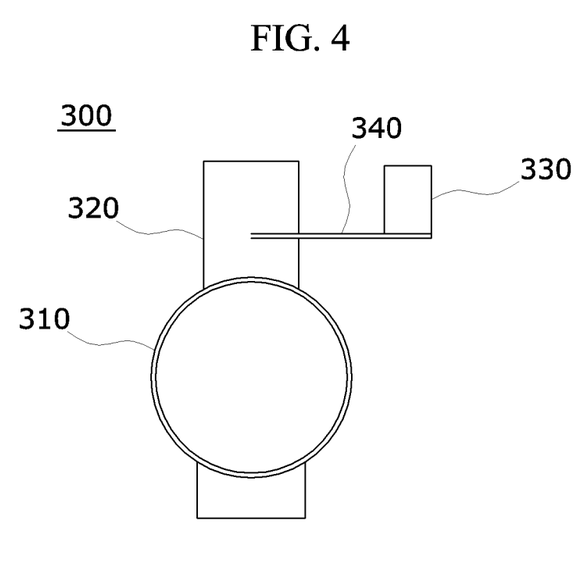
FIG. 4 is a front view illustrating a front side of the reinforcement portion according to the exemplary embodiment of the present disclosure.
Figure 5:
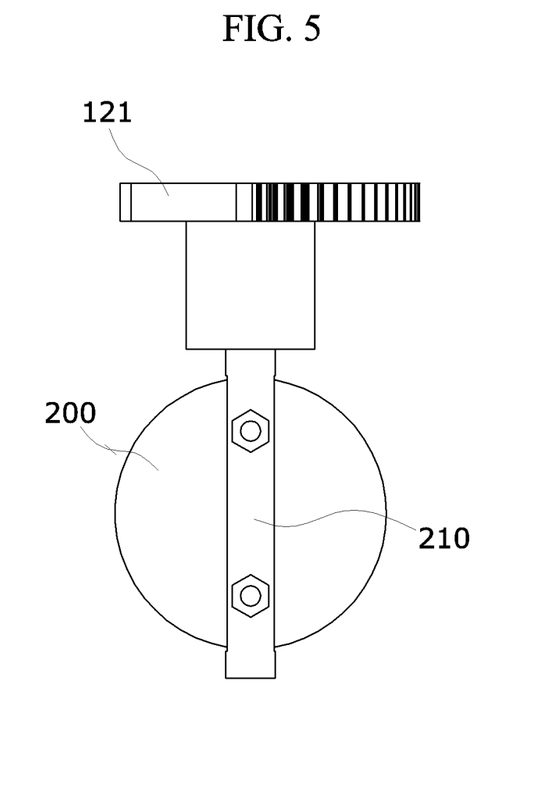
FIG. 5 is a front view illustrating front sides of a segment gear and a rotary shaft according to the exemplary embodiment of the present disclosure.
Figure 6A:
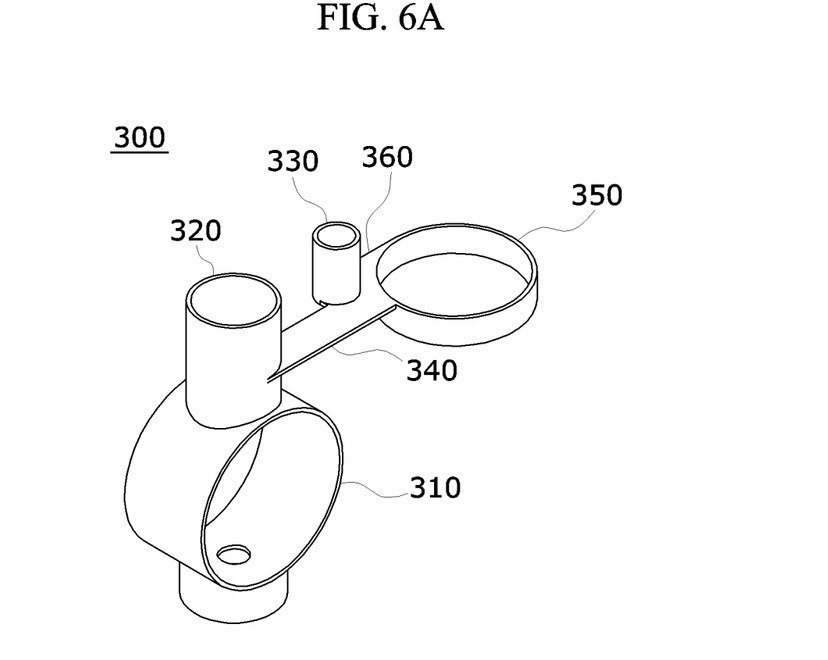
FIG. 6A is a perspective view illustrating a reinforcement portion according to another exemplary embodiment of the present disclosure.
Figure 6B:
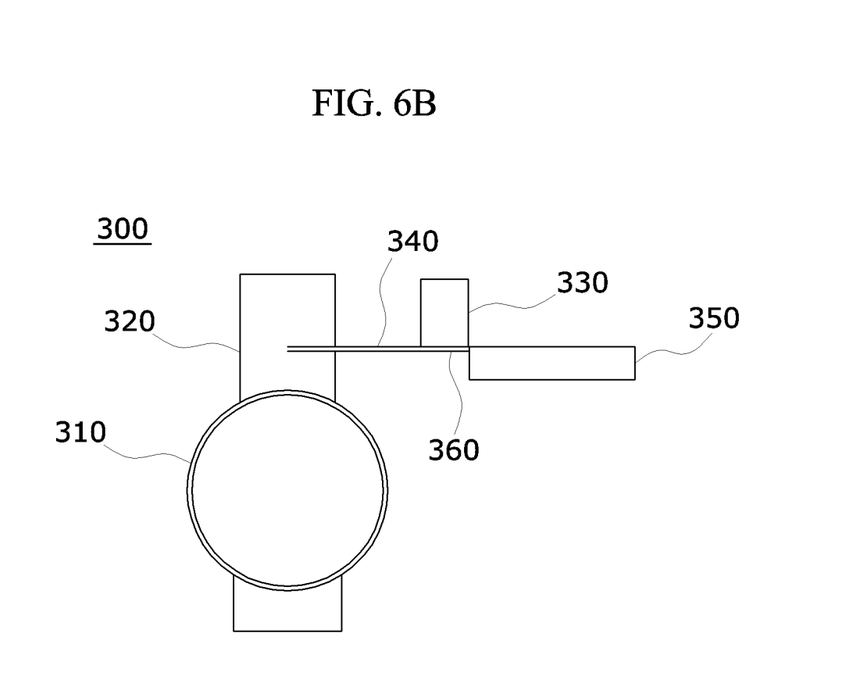
FIG. 6B is a front view illustrating a front side of the reinforcement portion of FIG. 6A according to another exemplary embodiment of the present disclosure.
Figure 7A:
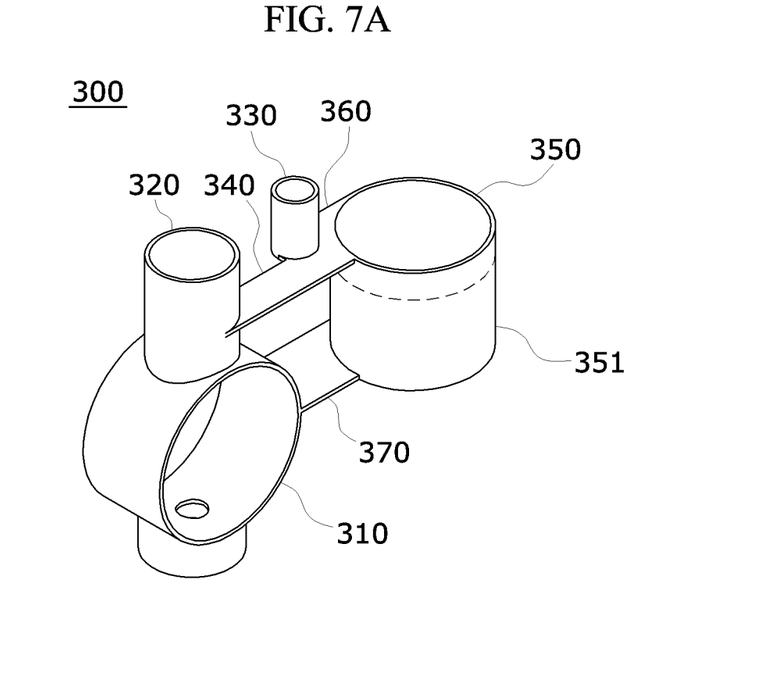
FIG. 7A is a perspective view illustrating a reinforcement portion according to still another exemplary embodiment of the present disclosure.
Figure 7B:
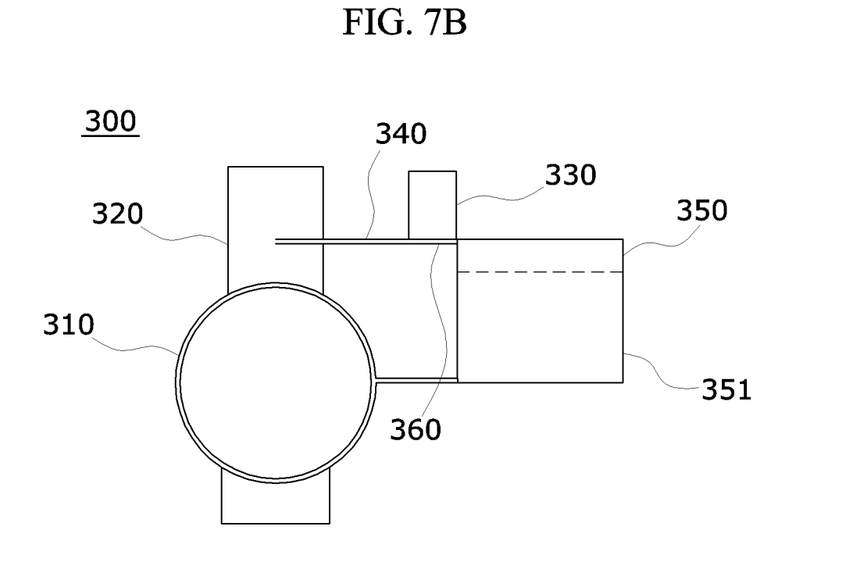
FIG. 7B is a front view illustrating a front side of the reinforcement portion of FIG. 7A according to still another exemplary embodiment of the present disclosure.

Hereinafter, embodiments of the present disclosure will be described in detail with reference to the accompanying drawings. FIG. 1 is a perspective view illustrating a throttle valve assembly according to an exemplary embodiment of the present disclosure, FIG. 2 is an exploded perspective view illustrating the throttle valve assembly according to the exemplary embodiment of the present disclosure, FIG. 3 is an exploded cross-sectional perspective view illustrating of a valve body and a reinforcement portion according to the exemplary embodiment of the present disclosure, FIG. 4 is a front view illustrating a front side of the reinforcement portion according to the exemplary embodiment of the present disclosure, FIG. 5 is a front view illustrating front sides of a segment gear and a rotary shaft according to the exemplary embodiment of the present disclosure, FIG. 6A is a perspective view illustrating a reinforcement portion according to another exemplary embodiment of the present disclosure, FIG. 6B is a front view illustrating a front side of the reinforcement portion of FIG. 6A, FIG. 7A is a perspective view illustrating a reinforcement portion according to still another exemplary embodiment of the present disclosure, and FIG. 7B is a front view illustrating a front side of the reinforcement portion of FIG. 7A.

Referring to FIGS. 1 to 7B, a throttle valve assembly according to the present disclosure may include a motor 131 coupled to a pinion gear 132 to generate power, an intermediate gear 141 meshed with the pinion gear 132, and a segment gear 121 meshed with the intermediate gear 141 to be rotated by the power generated from the motor 131. The segment gear 121 may include gear teeth on a part of its outer circumference, but the present disclosure is not limited thereto, and the segment gear 121 may include gear teeth on a full outer circumference thereof. The throttle valve assembly may include a valve body 100, a valve plate 200, and a reinforcement portion 300.

The valve body 100 may form a body of the throttle valve assembly, include (e.g., made of or formed of) plastic, and accommodate various components therein. The valve body 100 may include plastic to reduce the weight of the throttle valve assembly. In addition, an aspect of the present disclosure may reduce the cost for manufacturing the throttle valve assembly.

The valve body 100 may include an intake passage 110, a mounting space 120, a motor accommodating space 130, and a mounting groove 140. The intake passage 110 may be formed to be open. The intake passage 110 may include the valve plate 200 disposed therein and allow air or mixed gas to be introduced into the valve body 100 depending on opening/closing of the valve plate 200. The mounting space 120 may perpendicularly pass through the intake passage 110, e.g., in the vertical direction, to communicate with the intake passage 110, and the segment gear 121 may be disposed in the mounting space 120. The motor accommodating space 130 may be disposed adjacent to the mounting space 120 and formed to be perpendicular to the intake passage 110, and the motor 131 may be disposed in the motor accommodating space 130. The mounting groove 140 may be disposed between the mounting space 120 and the motor accommodating space 130 and formed to be perpendicular to the intake passage 110, and the intermediate gear 141 may be disposed in the mounting groove 140.

The valve plate 200 may be formed in substantially same shape as a sectional shape of the intake passage 110 and coupled to a rotary shaft 210 rotatably installed within the intake passage 110 of the valve body 100. The valve plate 200 may be configure to rotate on the rotary shaft 210 to open or close the intake passage 110 to thereby control (e.g., adjust) the amount of air or a mixed gas ingested into an engine. The rotary shaft 210 may be formed in a cylindrical shape and include one end and the other end each of which is inserted through a wall surface of the intake passage 110 to be rotatably coupled to the inside of the intake passage 110. In addition, the rotary shaft 210 may include a slot formed in a longitudinal direction in an outer circumferential surface of the rotary shaft 210 to allow the valve plate 200 to be inserted thereinto and fixed by at least one fixing member.

The reinforcement portion 300 may include a metal formed by, for example, a die casting method, and may be coupled to the inside of the valve body 100 by an insert injection method. In particular, the reinforcement portion 300 may include a metal such as aluminum. Accordingly, a tighter dimensional tolerance may be achieved, thereby eliminating or reducing a post-processing process due to a loose dimensional tolerance, and reducing the number of the manufacturing processes of the throttle valve assembly.

The reinforcement portion 300 may include a valve mounting portion 310, a first mounting portion 320, a second mounting portion 330, and a first connecting portion 340. The valve mounting portion 310 may include an aperture passing therethrough from one side to the other side thereof and may be formed in a shape that corresponds to an inner circumferential surface of the intake passage 110. In addition, the valve mounting portion 310 may be disposed on the inner circumferential surface of the intake passage 110 to be coupled to the intake passage 110. The valve mounting portion 310 may include the valve plate 200 coupled to the inside thereof. In particular, the valve plate 200 may be coupled to the valve mounting portion 310 to allow air or a mixed gas to be introduced into the valve body 100 through the valve mounting portion 310 depending on the opening/closing of the valve plate 200.

Further, the valve mounting portion 310 may include a metal such as aluminum, as described above. Accordingly, even when an outer circumferential surface of the valve plate 200 repeatedly collides with an inner circumferential surface of the valve mounting portion 310 due to the valve plate 200 operation, the inner circumferential surface of the valve mounting portion 310 may withstand abrasion.

The first mounting portion 320 may include an aperture passing therethrough from one side to the other side thereof in a direction perpendicular to the valve mounting portion 310 and communicate with the valve mounting portion 310. In addition, the first mounting portion 320 may be formed in a shape that corresponds to an inner circumferential surface of the mounting space 120 of the valve body 100 and may be disposed on the inner circumferential surface of the mounting space 120 to be coupled to the mounting space 120. The first mounting portion 320 may receive the segment gear 121 rotatably coupled thereto. The segment gear 121 may be connected to an end of the rotary shaft 210 of the valve plate 200. In particular, the end of the rotary shaft 210 may protrude to pass through an aperture through which the valve mounting portion 310 and the first mounting portion 320 communicate with each other, and may be coupled to the segment gear 121. In other words, the rotary shaft 210 of the valve plate 200 may be disposed in a longitudinal direction such that the end of the rotary shaft 210 is coupled to the segment gear 121. Accordingly, the segment gear 121 may rotate the rotary shaft 210 of the valve plate 200 to adjust the amount of air or mixed gas ingested into the engine.

Further, a shaft member may pass through the segment gear 121, and the segment gear 121 may be inserted into the mounting space 120 through the shaft member. Accordingly, the rotary shaft 210 of the valve plate 200 may pass through the aperture through which the valve mounting portion 310 and the first mounting portion 320 communicate with each other, and the shaft member of the segment gear 121 may also pass through the aperture to allow an end of the shaft member of the segment gear 121 to be coupled to the end of the rotary shaft 210 of the valve plate 200. In addition, although the shaft member has been described as passing through the segment gear 121, the end of the rotary shaft 210 mounted on the valve plate 200 may be directly or integrally connected to the segment gear 121 to allow the segment gear 121 to be rotated.

The second mounting portion 330 may be spaced apart from the first mounting portion 320 and include an aperture passing therethrough from one side to the other side thereof in a direction perpendicular to the valve mounting portion 310. In addition, the second mounting portion 330 may be formed in a shape that corresponds to an inner circumferential surface of the mounting groove 140 of the valve body 100 to be disposed on the inner circumferential surface of the mounting groove 140 and coupled to the mounting groove 140. The second mounting portion 330 may be rotatably coupled to the intermediate gear 141. The intermediate gear 141 may be inserted into the second mounting portion 330 through a shaft member similar to the segment gear 121, and thus, details thereof will be omitted to avoid obscuring the subject matter of the present disclosure.

The first connecting portion 340 may be disposed between the first mounting portion 320 and the second mounting portion 330 and connect the first mounting portion 320 and the second mounting portion 330. In other words, the first mounting portion 320 and the second mounting portion 330 may be connected to each other by the first connecting portion 340. Accordingly, the first mounting portion 320 and the second mounting portion 330 formed of a metal, such as aluminum, may be connected to each other by the first connecting portion 340 formed of the same material as the first mounting portion 320 and the second mounting portion 330 to support the segment gear 121 coupled to the first mounting portion 320 and the intermediate gear 141 coupled to the second mounting portion 330.

A reinforcement portion 300 according to another exemplary embodiment of the present disclosure may set a shaft-to-shaft distance between the pinion gear 132 mounted on the motor 131 and the segment gear 121. Referring to FIGS. 6A and 6B, a reinforcement portion 300 according to another exemplary embodiment of the present disclosure may include a third mounting portion 350 and a second connecting portion 360. The third mounting portion 350 may have a vertical length less than or equal to a vertical length of the second mounting portion 330, and the third mounting portion 350 may be spaced apart from the second mounting portion 330 in a direction away from the first mounting portion 320 and include an aperture passing therethrough from one side to the other side thereof in a direction perpendicular to the valve mounting portion 310. The third mounting portion 350 may be formed in a shape that corresponds to an inner circumferential surface of the motor accommodating space 130 of the valve body 100 and may be disposed on the inner circumferential surface of the motor accommodating space 130 to be coupled to the motor accommodating space 130.

The third mounting portion 350 may receive the motor 131 mounted thereon. The motor 131 may be coupled to the pinion gear 132, and the pinion gear 132 may be meshed with the intermediate gear 141. As such, the pinion gear 132 may be meshed with the intermediate gear 141 to transfer power generated from the motor 131 to the segment gear 121 meshed with the intermediate gear 141.

The second connecting portion 360 may be disposed between the second mounting portion 330 and the third mounting portion 350 and connect the second mounting portion 330 to the third mounting portion 350. In other words, the second mounting portion 330 and the third mounting portion 350 may be connected to each other by the second connecting portion 360. Accordingly, the first mounting portion 320, the second mounting portion 330, and the third mounting portion 350 formed of a metal, such as aluminum, may be connected to each other by the first connecting portion 340 and the second connecting portion 360 formed of the same material as the first mounting portion 320, the second mounting portion 330, and the third mounting portion 350 to support the segment gear 121 coupled to the first mounting portion 320, the intermediate gear 141 coupled to the second mounting portion 330, and the motor 131 mounted on the third mounting portion 350.

In addition, the first mounting portion 320, the second mounting portion 330, and the third mounting portion 350 may be connected to each other by the first connecting portion 340 and the second connecting portion 360 formed of a metal, such as aluminum, to prevent distances between the first mounting portion 320, the second mounting portion 330, and the third mounting portion 350 from being changed due to thermal deformation of the valve body 100.

Furthermore, a reinforcement portion 300 according to still another exemplary embodiment of the present disclosure may prevent the motor 131 from being separated from the third mounting portion 350 and may suppress (e.g., dampen) vibration of the motor 131 during operation of the motor 131 mounted on the third mounting portion 350. Referring to FIGS. 7A and 7B, the reinforcement portion 300 according to the still another exemplary embodiment of the present disclosure may include an extending portion 351 and an auxiliary connecting portion 370 formed under the third mounting portion 350. The extending portion 351 may extend downward from a lower end of the third mounting portion 350, marked as a broken line, to surround a circumference of the motor 131. The extending portion 351 may have a length sufficient to suppress the vibration of the motor 131.

The auxiliary connecting portion 370 may be spaced downward from the second connecting portion 360 between the third mounting portion 350 and the valve mounting portion 310 to connect the second mounting portion 330 and the valve mounting portion 310. In other words, the third mounting portion 350 and the valve mounting portion 310 may be connected to each other by the auxiliary connecting portion 370. Accordingly, the extending portion 351 of the third mounting portion 350 and the auxiliary connecting portion 370 may suppress vibration of the motor 131 generated during operation of the motor 131.

In addition, the valve mounting portion 310, the first to third mounting portions 320, 330, and 350, the first and second connecting portions 340 and 360, and the auxiliary connecting portion 370 forming the reinforcement portion 300 may be integrated into one structure. Accordingly, the reinforcement portion 300 may allow the motor 131, the segment gear 121, and the intermediate gear 141 to be mounted on the valve body 100 even with vibration due to the operation of the motor 131 and impact due to rotation of the segment gear 121, the intermediate gear 141, or the valve plate 200.

Although the reinforcement portion 300 has been described as being formed of aluminum, the reinforcement portion 300 may include various types of metals provided that the metal may be coupled to the valve body 100 formed of plastic with an insert injection method, withstand abrasion due to a contact with the valve plate 200 being repeatedly rotated, and support the segment gear 121, the intermediate gear 141, and the motor 131. In addition, although the reinforcement portion 300 according to exemplary embodiments of the present disclosure has been described as being manufactured simultaneously by a die casting method, the components forming the reinforcement portion 300 may be separately manufactured and coupled to each other by a joining method such as, for example, welding, provided that the components forming the reinforcement portion 300 may be coupled to the valve body 100 formed of plastic with an insert injection method.

As described above, the throttle valve assembly according to the present disclosure may include the valve body 100 formed of plastic to reduce the weight of the throttle valve assembly, and thus to reduce the manufacturing cost of the throttle valve assembly. Further, the reinforcement portion 300 may include a metal, such as aluminum, to have a tighter dimensional tolerance to minimize a post processing process due to a loose dimensional tolerance, and the number of manufacturing processes of the throttle valve assembly may be reduced.

In addition, the valve mounting portion 310 may include a metal, such as aluminum, to enable an inner circumferential surface of the valve mounting portion 310 to withstand abrasion even when repeatedly colliding with an outer circumferential surface of the valve plate 200 due to the valve plate 200 operation.

Further, the first mounting portion 320, the second mounting portion 330, and the third mounting portion 350 formed of a metal, such as aluminum, may be connected to each other by the first connecting portion 340 and the second connecting portion 360 formed of the same material as the first mounting portion 320, the second mounting portion 330, and the third mounting portion 350 to support the segment gear 121 coupled to the first mounting portion 320, the intermediate gear 141 coupled to the second mounting portion 330, and the motor 131 mounted on the third mounting portion 350. Moreover, distances between the first mounting portion 320, the second mounting portion 330, and the third mounting portion 350 may be prevented from being changed even with thermal deformation of the valve body 100. In addition, the third mounting portion 350 and the valve mounting portion 310 may be connected to each other by the auxiliary connecting portion 370. Accordingly, the auxiliary connecting portion 370 and the extending portion 351 of the third mounting portion 350 may suppress vibration of the motor 131 generated during operation of the motor 131.

In addition, the valve mounting portion 310, the first to third mounting portions 320, 330, and 350, the first and second connecting portions 340 and 360, and the auxiliary connecting portion 370 forming the reinforcement portion 300 may be integrated into one structure, and the reinforcement portion 300 may allow the motor 131, the segment gear 121, and the intermediate gear 141 to be mounted on the valve body 100 even with vibration due to the operation of the motor 131 and impact due to rotation of the segment gear 121, the intermediate gear 141, or the valve plate 200.

Since the valve body includes plastic, the weight of the throttle valve assembly may be reduced, and the manufacturing cost of the throttle valve assembly may be reduced.

The reinforcement portion may be formed by a die casting method using a metal, such as aluminum, to have a tighter dimensional tolerance, and a post processing process and number of overall manufacturing processes of the throttle valve assembly may be minimized. Since the valve mounting portion includes a metal such as aluminum, an inner circumferential surface of the valve mounting portion may withstand abrasion even when repeatedly colliding with an outer circumferential surface of the valve plate.

The first mounting portion, the second mounting portion, and the third mounting portion formed of a metal, such as aluminum, may be connected to each other by the first connecting portion and the second connecting portion formed of the same material as the first mounting portion, the second mounting portion, and the third mounting portion to support the segment gear coupled to the first mounting portion, the intermediate gear coupled to the second mounting portion, and the motor mounted on the third mounting portion. Accordingly, distances between the first mounting portion, the second mounting portion, and the third mounting portion may be prevented from being changed due to thermal deformation of the valve body. The third mounting portion and the valve mounting portion may be connected to each other by the auxiliary connecting portion, and thus the auxiliary connecting portion and the extending portion of the third mounting portion may suppress vibration of the motor generated during operation of the motor.

The valve mounting portion, the first to third mounting portions, the first and second connecting portions, and the auxiliary connecting portion forming the reinforcement portion may be integrated into one structure, and thus, the reinforcement portion may allow the motor, the segment gear, and the intermediate gear to be securely mounted on the valve body even with vibration due to the operation of the motor and impact due to rotation of the segment gear, the intermediate gear, or the valve plate.

Although the present disclosure has been described with reference to the exemplary embodiments, it should be understood by those skilled in the art that changes and modifications are possible without departing from the scope and sprit of the disclosure.

What is claimed is:

1. A throttle valve assembly for supporting a motor coupled to a pinion gear to generate power, an intermediate gear meshed with the pinion gear, and a segment gear meshed with the intermediate gear to be rotated by the power generated from the motor, the throttle valve assembly comprising:
    a valve body including an intake passage, a mounting space that communicates with the intake passage, a motor accommodating space, and a mounting groove formed between the mounting space and the motor accommodating space, wherein the valve body includes a plastic;
    a valve plate coupled to a rotary shaft that is rotatably installed in the intake passage of the valve body to adjust an amount of air or a mixed gas ingested into an engine; and
    a reinforcement portion including a metal and disposed within the valve body by an insert injection method, wherein the reinforcement portion comprises:
    a valve mounting portion formed in a shape that corresponds to an inner circumferential surface of the intake passage to be coupled to the inner circumferential surface of the intake passage,
    a first mounting portion formed in a shape that corresponds to an inner circumferential surface of the mounting space to be coupled to the inner circumferential surface of the mounting space and perpendicularly passing through the valve mounting portion to communicate with the valve mounting portion,
    a second mounting portion spaced apart from the first mounting portion and forme in a shape that corresponds to an inner circumferential surface of the mounting groove to be coupled to the inner circumferential surface of the mounting groove,
    wherein the segment gear is rotatably coupled to the first mounting portion and the intermediate gear is rotatably coupled to the second mounting portion.

2. The throttle valve assembly of claim 1, wherein the reinforcement portion further comprises:
    a first connecting portion disposed between the first mounting portion and the second mounting portion to connect the first mounting portion to the second mounting portion.

3. The throttle valve assembly of claim 1, wherein the segment gear is coupled to an end of the rotary shaft of the valve plate and configured to rotate the valve plate.

4. The throttle valve assembly of claim 2, wherein the reinforcement portion further comprises:
    a third mounting portion disposed to be spaced apart from the second mounting portion and configured to receive the motor mounted therein; and
    a second connecting portion disposed between the second mounting portion and the third mounting portion to connect the second mounting portion to the third mounting portion.

5. The throttle valve assembly of claim 4, wherein the third mounting portion has a vertical length less than or equal to a vertical length of the second mounting portion.

6. The throttle valve assembly of claim 4, wherein the third mounting portion includes an extending portion that extends downward therefrom.

7. The throttle valve assembly of claim 6, wherein the reinforcing portion further comprises:
    an auxiliary connecting portion disposed under the second connecting portion between the third mounting portion and the valve mounting portion to connect the extending portion to the valve mounting portion.

* * * * *